US010014997B2

(12) United States Patent
Zirwas

(10) Patent No.: US 10,014,997 B2
(45) Date of Patent: Jul. 3, 2018

(54) ESTIMATION OF WEAK CHANNEL COMPONENTS

(71) Applicant: NOKIA SOLUTIONS AND NETWORKS GMBH & CO. KG, Munich (DE)

(72) Inventor: Wolfgang Zirwas, Munich (DE)

(73) Assignee: Nokia Solutions and Networks GmbH & Co. KG, Munich (DE)

(*) Notice: Subject to any disclaimer, the term of this patent is extended or adjusted under 35 U.S.C. 154(b) by 0 days.

(21) Appl. No.: 14/414,017

(22) PCT Filed: Jul. 12, 2013

(86) PCT No.: PCT/EP2013/064814
§ 371 (c)(1),
(2) Date: Jan. 9, 2015

(87) PCT Pub. No.: WO2014/009539
PCT Pub. Date: Jan. 16, 2014

(65) Prior Publication Data
US 2015/0172018 A1 Jun. 18, 2015

(30) Foreign Application Priority Data
Jul. 13, 2012 (EP) .................................. 12176412

(51) Int. Cl.
H04L 5/00 (2006.01)
H04W 52/32 (2009.01)
(Continued)

(52) U.S. Cl.
CPC .......... H04L 5/0048 (2013.01); H04L 5/0035 (2013.01); H04L 5/0091 (2013.01);
(Continued)

(58) Field of Classification Search
CPC .... H04B 7/024; H04B 7/0617; H04B 7/0667; H04B 7/0671; H04B 7/0891;
(Continued)

(56) References Cited

U.S. PATENT DOCUMENTS

2011/0170435 A1 7/2011 Kim et al.
2011/0176440 A1* 7/2011 Frank .................... H04W 64/00
370/252
(Continued)

FOREIGN PATENT DOCUMENTS

WO 2012023550 A1 2/2012

OTHER PUBLICATIONS

R1-092628; Motorola; "On Serving Cell Muting for OTDOA Measurements"; 3GPP TSG RAN1 #57; Los Angeles, CA, USA, Jun. 29-Jul. 3, 2009.
(Continued)

Primary Examiner — Jung Park
Assistant Examiner — M Mostazir Rahman
(74) Attorney, Agent, or Firm — Brake Hughes Bellermann LLP

(57) ABSTRACT

An apparatus and a method are provided, by which transmission of reference signals is controlled such that reference signals are transmitted in different time intervals depending on the strength of reception of the reference signals at the user equipment (UE) side. Moreover, an apparatus and a method are provided by which configuration information for measuring reference signals is received, wherein the configuration information comprises an indication about time intervals, during which reference signal with different strength of transmission are sent.

16 Claims, 6 Drawing Sheets

(51) Int. Cl.
*H04L 25/02* (2006.01)
*H04W 52/24* (2009.01)
*H04B 7/024* (2017.01)
*H04B 7/06* (2006.01)

(52) U.S. Cl.
CPC ...... *H04L 25/0204* (2013.01); *H04L 25/0228* (2013.01); *H04W 52/245* (2013.01); *H04W 52/325* (2013.01); *H04B 7/024* (2013.01); *H04B 7/0617* (2013.01); *H04L 5/0007* (2013.01)

(58) Field of Classification Search
CPC .............. H04B 7/0894; H04L 25/0204; H04L 25/0228; H04L 5/0007; H04L 5/0035; H04L 5/0048; H04L 5/0091; H04L 5/0053; H04W 52/245; H04W 52/325; H04W 72/0413; H04W 88/02
See application file for complete search history.

(56) References Cited

U.S. PATENT DOCUMENTS

| | | | |
|---|---|---|---|
| 2011/0281608 A1* | 11/2011 | Wu | H04L 5/0007 455/509 |
| 2012/0176965 A1 | 7/2012 | Zhu et al. | |
| 2012/0327800 A1* | 12/2012 | Kim | H04W 72/082 370/252 |
| 2013/0044685 A1* | 2/2013 | Fong | H04J 11/0053 370/328 |

OTHER PUBLICATIONS

R1-100248; Huawei; "Inter-cell CSI-RS Analysis"; 3GPP TSG RAN WG1 meeting #59bis; Valencia, Spain, Jan. 18-22, 2009.
International Search Report for International Application No. PCT/EP2013/064814, dated Sep. 19, 2013, 3 pages.
Office Action received for Korean Application No. 10-2015-7003727, dated Mar. 31, 2016, 10 pages. (5 pages Korean office Action + 5 Pages of English Translation).
3rd Generation Partnership Project (3GPP), R1-092628, "On Serving Cell Muting for OTDOA Measurements", Motorola, 3GPP TSG RAN1 #57, Los Angeles, CA, USA, Jun. 29-Jul. 3, 2009, 7 pages.
Chinese Office Action with English Translation for Chinese Application No. 201380037159.4, dated Nov. 7, 2016, 9 pages.
Second Office Action for Chinese Application 14/414,017, dated Jun. 9, 2017, 6 pages.
Third Office Action for Chinese Application 201380037159.4, dated Oct. 20, 2017, 6 pages.
Office Action with English translation for Japanese Application 2015-521017, dated Oct. 31, 2016, 3 pages.

* cited by examiner

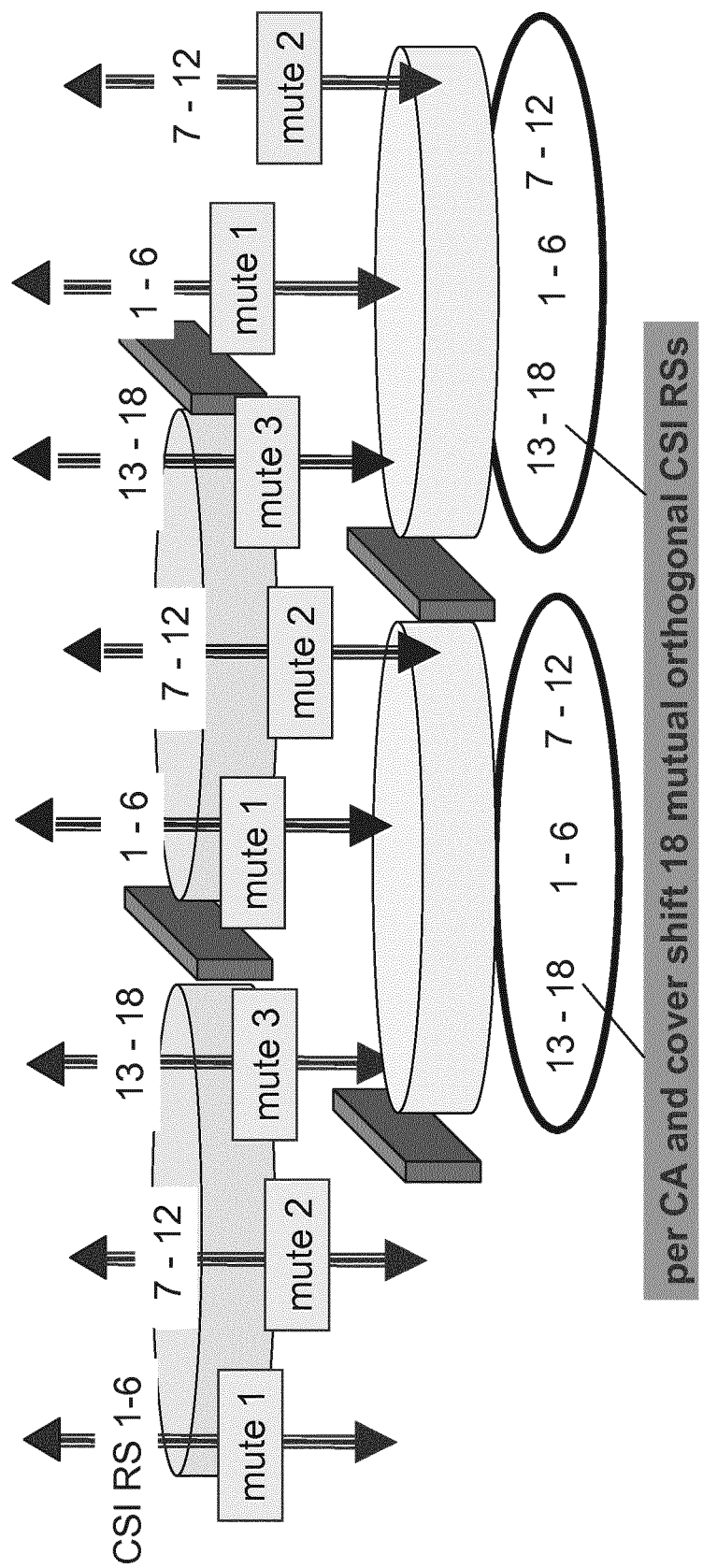

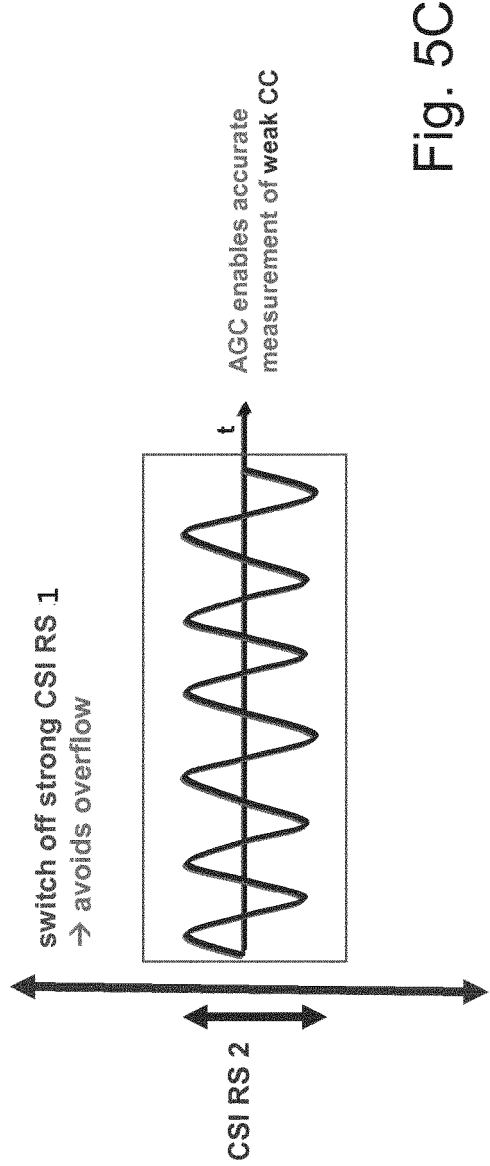
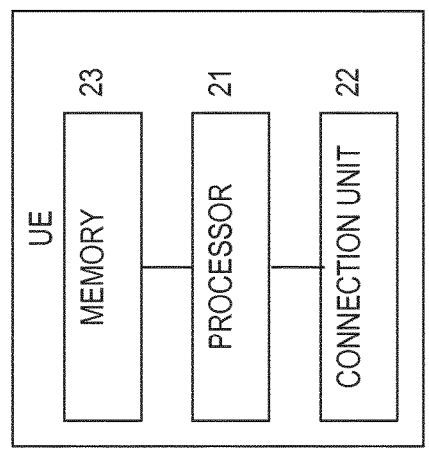
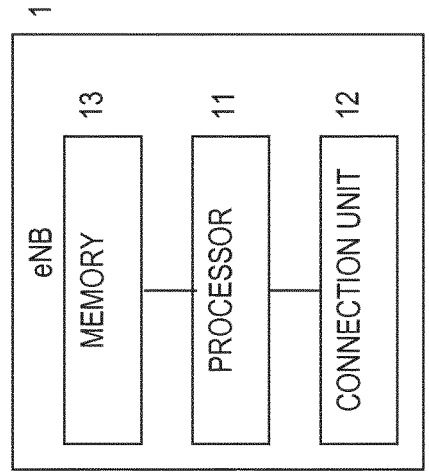

1

ESTIMATION OF WEAK CHANNEL COMPONENTS

This application is a national stage entry of PCT Application No. PCT/EP2013/064814, filed on Jul. 12, 2013, entitled "ESTIMATION OF WEAK CHANNEL COMPONENTS", which claims priority to and the benefit of European Application No. 12176412.0, filed on Jul. 13, 2012, which are hereby incorporated by reference in their entireties.

FIELD OF THE INVENTION

The present invention relates to apparatuses, methods and a computer program product for estimating weak channel components.

RELATED BACKGROUND ART

The following meanings for the abbreviations used in this specification apply:
ADC Analogue-digital converter
AGC Automatic gain control
AP Access point
CA Cooperation area
CC Channel component
CDM Code division multiplex
CoMP Cooperative multipoint transmission
CSI Channel state information
eNB enhanced Node B
FDM Frequency division multiplex
IQ Components of a signal in base band representation
ISD Inter site distance
JT Joint transmission
LTE Long Term Evolution
LTE-A LTE-Advanced
MIMO Multiple-input multiple-output
MSE Mean square error
MU Multi-user
OFDM Orthogonal frequency division multiplex
RE Resource element
RS Reference signal
RSRP Reference signal received power
Rx Reception
SI Study item
SINR Signal to Interference plus Noise Ratio
TDM Time division multiplex
Tx Transmission
UE User equipment
WB Wideband Embodiments of the present invention relate to mobile radio system concepts like 3GPP LTE, LTE-A and especially future optimizations for CoMP. In the EU founded project Artist 4G advanced CoMP is being investigated for downlink transmission and especially a novel interference mitigation scheme called IFM-A has been developed based on joint transmission (JT) CoMP. This novel interference mitigation framework has been developed promising significant performance gains over that so far reported from 3GPP CoMP SI. For example, for similar simulation assumptions more than 200% gain seems to be possible for the interference migration (IFM-A) framework compared to a 4×2 MU MIMO scenario as reference. Both cases are for ideal channel estimation, but a higher sensitivity can be expected for the CoMP system.

For practical JT CoMP systems accurate channel estimation is very important and for IMF-A this is especially true for weak channel components. It has been found that any improvement in channel estimation will help to increase system level performance.

Therefore, a highly sophisticated CSI estimation and feedback concept will be required to leverage a significant part of the above mentioned performance gains and this is true even for low to very moderate mobile speed.

Hence, it is desirable to significantly improve CSI estimation quality, especially with respect to the channel estimation of weak channel components. Simultaneously a small to moderate reference signal overhead should be kept.

SUMMARY OF THE INVENTION

Embodiments of the present invention address this situation and aim to provide an improved channel estimation quality.

According to a first aspect of the present invention an apparatus and a method are provided, by which transmission of reference signals is controlled such that reference signals are transmitted in different time intervals depending on the strength of reception of the reference signals at the user equipment (UE) side.

Muting and/or power boosting schemes may be used for controlling the transmission of the reference signals.

The time intervals may be defined dynamically.

The user equipment may be informed about the time intervals.

Reports from the user equipment on the strength of reception of the reference signals at the user equipment may be received.

For cooperative multipoint transmission a channel state information reference signal activation pattern may be applied.

According to a second aspect of the present invention, an apparatus and a method are provided by which configuration information for measuring reference signals is received, wherein the configuration information comprises an indication about time intervals, during which reference signal with different strength of reception are sent.

The configuration information may comprise an indication about muting and/or power boosting schemes used for controlling the transmission of the reference signals.

The input dynamic range of a receiver may be adjusted in the respective time intervals for adapting the receiver to receiving strong or weak reference signals.

Reports on the strength of reception of the reference signals may be transmitted.

For cooperative multipoint transmission the configuration information may comprise an indication about a channel state information reference signal activation pattern.

According to a further aspect of the present invention computer program products are provided including programs for processing devices, comprising software code portions for performing a method of the present invention when the respective program is run on a processing device.

The computer program products may comprise a computer-readable medium on which the respective software code portions are stored.

The computer program products may be directly loadable into internal memories of the processing devices.

BRIEF DESCRIPTION OF THE DRAWINGS

These and other objects, features, details and advantages will become more fully apparent from the following detailed description of embodiments of the present invention which is to be taken in conjunction with the appended drawings, in which:

FIG. 4 shows an extension of the channel estimation concept to different cover shifts according to an embodiment of the present invention, FIG. 5A to 5C illustrate the problem of measuring weak and strong channel components and the solution according to embodiments of the present invention, and FIGS. 6A and 6B show examples for apparatuses according to embodiments of the present invention.

DETAILED DESCRIPTION OF EMBODIMENTS

In the following, description will be made to embodiments of the present invention. It is to be understood, however, that the description is given by way of example only, and that the described embodiments are by no means to be understood as limiting the present invention thereto.

However, before discussing detailed embodiments of the present invention, some more considerations regarding the problem of improving the channel estimation quality are given in the following.

In particular, for the above mentioned interference mitigation framework one important part is to decouple the so called cooperation areas (CA) paving the overall network by a novel interference floor shaping technique together with a so called cover shift concept, being mainly overlapping CAs.

This is very beneficial as for performance analysis—or here more important—channel estimation one can limit the investigations to a single CA. Unfortunately the size of a single CA has to be relatively large e.g. exemplary might include 3 sites leading to 9 cells in case of 3 sectors per site. In combination with 4 Tx antennas per cell each CA is formed by overall 36 channel components (CC).

As many CCs within the CA are extremely small, the so called Partial CoMP concept limits reporting to the relevant CCs with a Rx-power above a certain threshold TH. A threshold selected so that there are only minor degradations compared to ideal CSI estimation will result in few to 10 or even 20 relevant CCs for some UEs.

Figure 1:
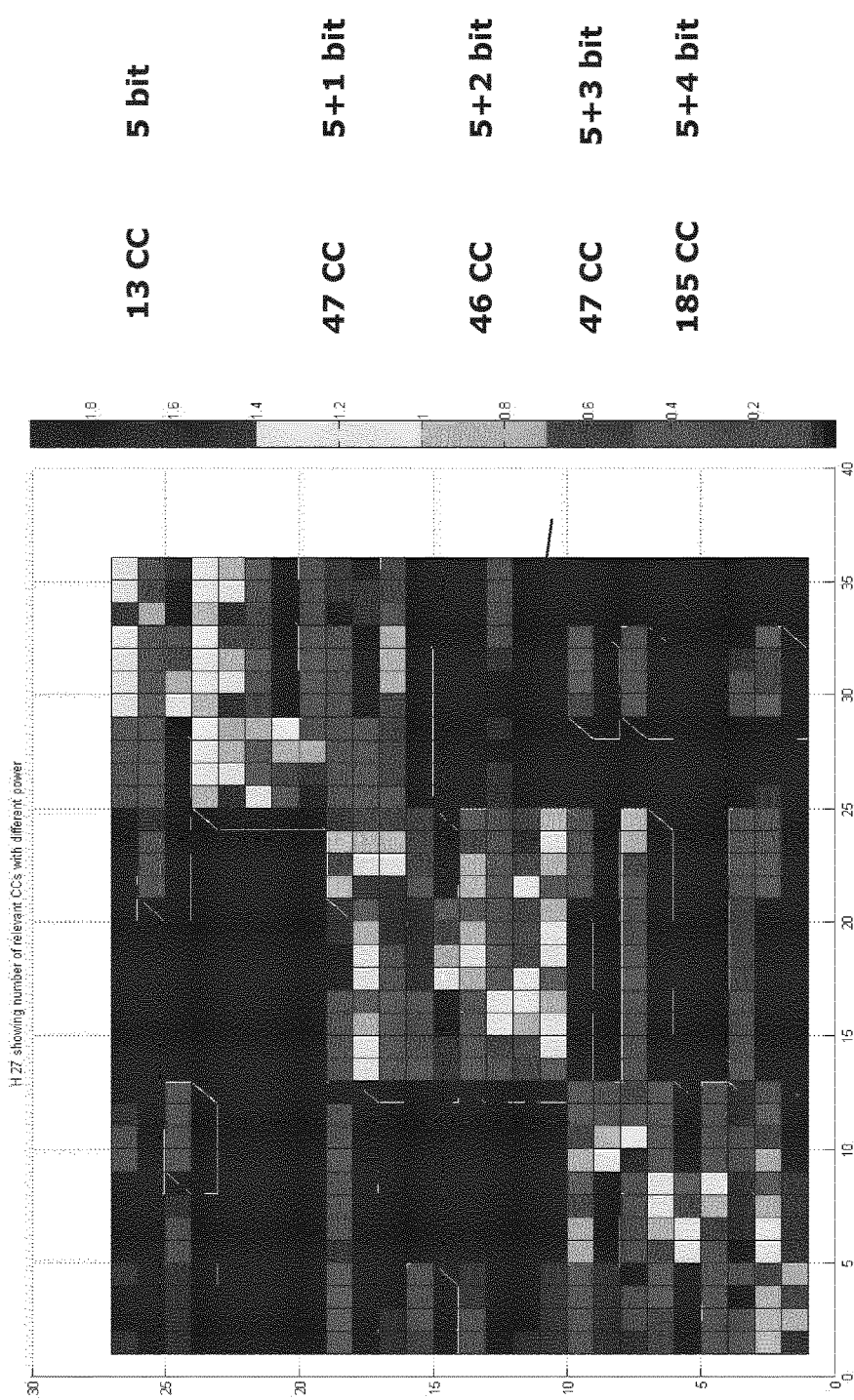
FIG. 1 illustrates a situation in which a single cooperation area (CA) serves 27 UEs with 36 wideband (WB) beams.

FIG. 1 illustrates a typical distribution of CCs to UEs. Different strengths are of the CCs are indicated by different gray shades. The example of FIG. 1 illustrates a single CA serving 27 UEs (y-axis) with 36 WB beams (x-axis). Colours—or more precisely gray scales—are related to signal strength of CCs $|h_{km}|^2$ and the accordingly optimum allocation of quantization bits. Unreported CCS, which are not reported since there strength is below the threshold TH mentioned above, are dark. At the right side the number of CCs for certain power windows is given and additionally the ideally required number bits for a simple IQ quantization is given.

As can be seen, in the example of FIG. 1, there are 13 CC having the highest strength (with a power value of 1.4 to 2.0), 47 CC with a power value of 1 to 1.4, 46 CCs with a power value of 0.7 to 1, 47 CCs with a power value of 0.5 to 0.7 and 185 CCs with a power value below 0.5 and above the threshold TH. What can be seen is that with decreasing Rx power, the required CSI estimation accuracy is increasing. That leads to a serious challenge as weak channels are per se more difficult to estimate and at the same time the accuracy requirements are significantly more stringent.

Assuming a professional measurement device providing a large dynamic range, it would be sufficient to ensure reception of the orthogonal CSI RSs near to interference free to allow estimation of weak and strong CCs. However, a typical UE has for cost reasons a quite restricted dynamic range of today e.g. 20 to maybe 25 dB. Further evolution might improve the dynamic range to maybe 30 dB, but this is still away from the above given requirements.

Embodiments of the present invention exploit some observations one can make from FIG. 1 which shows the signal strength from each Tx antenna to each UE. For weaker CCs, the accuracy requirements are increasing (here visible at the right side from the given number of quantization bits), which can be partly explained by the higher number of weaker CCs.

Important is now that for weaker CCs the upper bits are meaningless and can be omitted. In another way the absolute CSI accuracy with respect to the strongest CC is increasing for the weaker CCs, but the relative accuracy per CC is more or less constant for all levels of Rx power. This relative accuracy is therefore much lower and in a range of 25 to 30 dB, i.e. it might be in the dynamic range of future UEs.

This knowledge can be exploited, but requires an adapted CSI RS concept to avoid that an UE has to estimate strong and weak CCs in one OFDM symbol simultaneously. In such a case the strong will override the weak signal, even if the CSI RSs are on different frequency bins. A further look at FIG. 1 indicates that the strong CCs are transmitted from the site containing the serving cell and the weak CCs are typically from the other sites.

Figure 2:
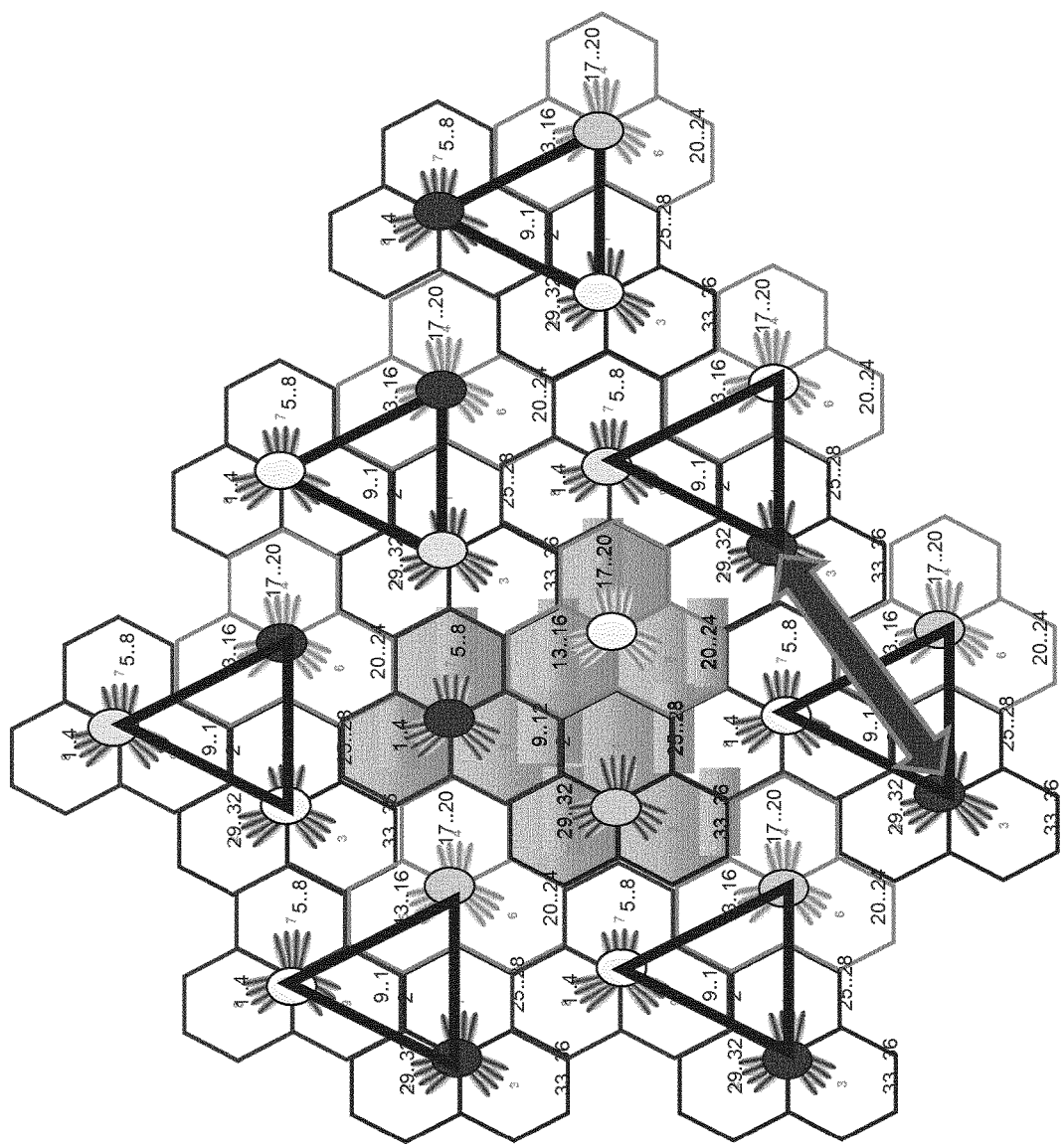
FIG. 2 illustrates a site activation pattern according to an embodiment of the present invention.

Therefore the activation pattern of CSI RS transmission for different sites according to FIG. 2 is proposed, i.e. in each CA there is only one site active at a time and the two other sites are muted. In particular, FIG. 2 illustrates the proposed site activation pattern ensuring optimum mutual orthogonality. Dots with same colour (more precisely, grayscales) indicate simultaneous transmission of CSI-RSs. Different colours (more precisely, grayscales) of WB beams indicate mutually orthogonal CSI-RSs. The numbers in FIG. 2 indicate the indices into the WB beams of a cooperation area. Each cell has 4 WB (wideband) beams, each site has 3 cells, i.e., 3 times 4 WB beams. Each cooperation area consists of 3 cites (indicated by the triangles). Thus, there are overall 3 times 12=36 WB beams in each cooperation area.

According to the present embodiment, to minimize mutual interference from other CAs the site activation is coordinated so that in adjacent sites always orthogonal RS (e.g. by FDM or TDM) are being used. As a result the distance to the next site transmitting the same CSI RS is at least 3 inter site distances (ISD) away and will therefore generate only extremely weak interference.

The concept requires further that the transmission is restricted to one site at a time to avoid a simultaneous reception of signals from weak and strong cells at the UE. It is important that the UE receives CSI RS either for strong or weak CCs a this allows the UE to adapt its dynamic input range optimally to the according Rx power. This can be done either by adapting the AGC or in a more advanced version by using the higher or lower bits of the analogue-digital-converter (ADC) for the further UE processing.

Figure 3:
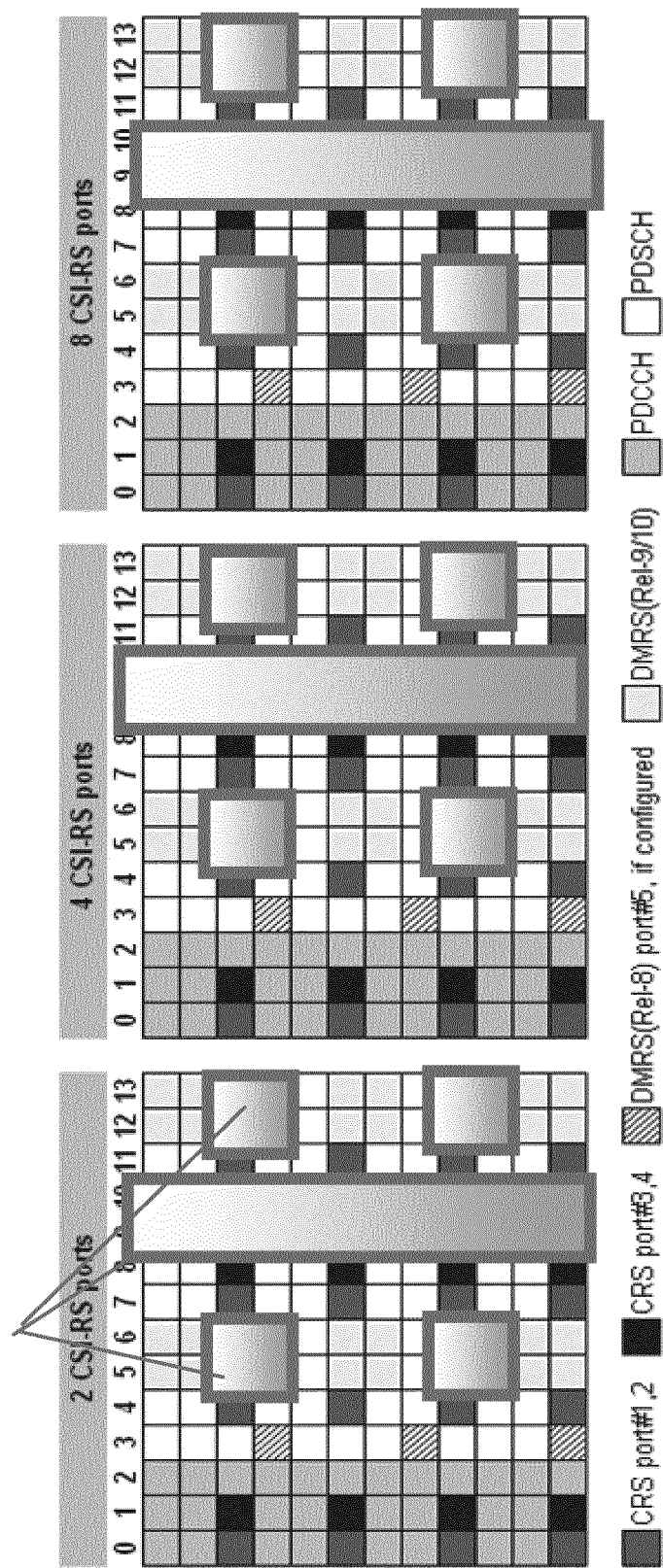
FIG. 3 illustrates CSI RS as defined for LTE-A in LTE Release 10.

Orthogonality between weak and strong signals suggests to use OFDM symbols 9 and 10 from a typical CSI RS sub frame according to LTE Release 10 as illustrated in FIG. 3.

These symbols are containing only CSI RSs and no additional data and they provide 24 REs allowing for a site with 12 antenna ports (3 sites a 4 Tx antennas) to have 2 REs per AP. This can should be used to increase the frequency selectivity of the channel estimation.

As a further part FIG. 4 illustrates how the allocation of CSI RSs can be applied to the different cover shifts as being part of the overall interference mitigation concept. In this example, the upper row illustrates two CAs each including 3 sites with 18 WB beams in total, indicated by the numbers 1 to 18. The lower row indicates two CAs after the cover shift, that is, the CAs are shifted such that, for example, two sites belonging to the right CA in the upper row now belong to the left CA in the lower row. Grey blocks indicate the decoupling of CAs by interference floor shaping. This decoupling can be achieved by cell individual vertical antenna tilting and power allocation. More precisely inbound WB beams use a low vertical tilt and a high TX power while outbound WB beams have a strong vertical tilt in combination with a low Tx power.

Hence, according to the embodiment described above, the following measures are carried out:

CSI RS site activation patterns are applied, by which strong and weak CCs are separated. Note, activation per site as described above is an example only.

Furthermore, orthogonal CSI RS are used in adjacent CAs for simultaneously active ones so that distance between active sites transmitting the same CSI RSs is maximized.

The UEs adjust individually their input dynamic range to strong or weak CCs so that all CCs can be estimated with the same relative accuracy.

Moreover, only OFDM symbols 9 and 10 are used for transmission of CSI RS so that the OFDM symbols carry only CSI RSs. Otherwise data signals would have to be muted or UEs would receive simultaneously strong and weak signals.

The same CSI RSs are applied in all cover shifts. As a result in each cover shift, CSI RSs with a certain AP range esteem from different sites. Accordingly signal strength of the sites might vary as well, which should be known to the UEs.

In the following, some details regarding an implementation of the embodiments described above are described.

A typical implementation at UE side has been explained above. The adaptation of the AGC values per UE should be done based on semistatic RSRP measurements for all relevant CCs. Ideally these RSRP values should be reported to the eNB so that it has a knowledge about which UEs sees what CCs with what strength. This might allow for a further optimization of the grouping of transmitted CSI RSs so that strong and weak CCs are separated as far as possible for all UEs.

As each site has 3 cells with 4 APs each power boosting is a further natural option to improve the CSI estimation accuracy, especially for the weak channels. As in each cell only one third of CSI RSs are active, a boosting power of 4.7 dB would be possible.

So far the overhead is very low with about 4.3% (24 REs every frame a 10 ms à 24/168/10=0.043) so one can even think of doubling or tripling the number of REs per AP providing further noise and interference reduction of e.g. 3 or 4.7 dB and still keeping the overhead below or near to 10%.

Hence, the overall concept is now very powerful:

Only slightly enhanced UEs are able to estimate weak to very weak channel components with very high accuracy and similar performance independent of the Rx power strength.

The muting and power boosting concept in combination with the overall interference mitigation framework achieves extremely low inter cell interference on the active CSI RSs. The channel estimation benefits similarly as the user data from the mutual decoupling of CAs and will allow several classes higher channel estimation performance compared to conventional cellular networks.

In the following, the problem regarding measuring of weak and strong reference signals and the solution according to embodiments of the present invention is described in the following in some more detail by referring to FIGS. 5A to 5C.

As mentioned above, for estimation of weak channel components (CC) (see for illustration FIG. 5A) there exist two main issues. Firstly the SINR for these CCs might be bad. As has been shown in the embodiments described above, this can be solved by a proper system design ensuring enough orthogonal resources for the basically sparse CSI RSs.

Figure 5A:
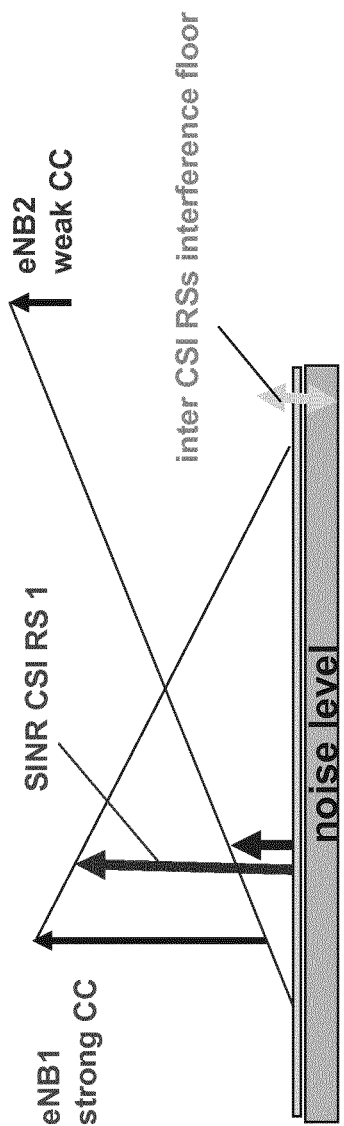

In more detail, FIG. 5A shows a typical situation in a cooperation area with a very strong and several relatively weak channel components. Depending on the noise floor and the inter CSI RS interference floor—which can be affected by a proper reference signal design—the weak channel component might have a high SINR as well, but might be concealed by the strong channel component.

A second issue for real world systems is the limited UE capabilities, i.e. the limited dynamic range of the UE receiver, which is typically in the range of 20 to maybe 25 dB. By adapting to a strong CC the weak CC will be hidden by this strong CC more or less. If the UE tries to adapt to the weak CC the receiver will be in overflow making any useful channel estimation impossible. See for illustration FIG. 5B.

Figure 5B:
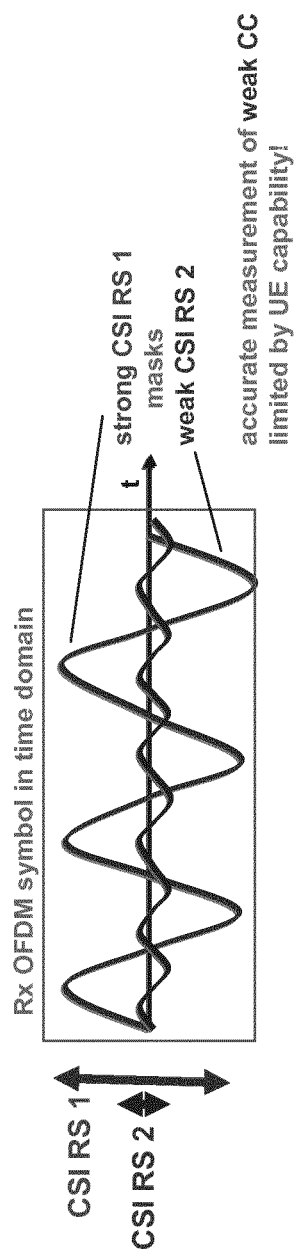

In detail, FIG. 5B illustrates that weak channel components are masked by strong channel components, which limits estimation accuracy of weak channel components.

Note, with weak CCs it is meant CSI RS being 10 to 20 dB below the Rx power of the strongest CSI RS. To estimate such a CSI RS with high accuracy—for example for a proper channel prediction—one might need a dynamic range of 30 to 40 dB.

Hence, according to embodiments of the present invention, two measurement phases are introduced, i.e. one for the estimation of strong CCs and a second one for the estimation of weak CCs. The eNB ensures that at a certain measurement and time instance only weak or only strong CCs will be on air.

FIG. 5C shows the proposed scheme with two measurement phases. In the 'weak CC' phase the strong CC (CSI RS 1) is switched off allowing the UEs to adapt their AGC values so that the full dynamic range and/or optimum dynamic range of the UEs can be used for the estimation of the weak CCs (CSI RS 2).

The benefit of this proposal is to allow accurate measurement of weak and strong CCs with similar accuracy. Note this is true under the assumption that the overall system setup ensures good SINR for all CSI RSs of all CCs.

For implementation CSI measurements have now to be harmonized between eNBs and UEs so that UEs know exactly at what time slots there will be only weak or strong CSI RSs so that they can adapt their AGC values accordingly.

Either these measurement phases are directly standardized or the eNBs will have to either broadcast or to send over the PDCCH according information to the UEs.

A general embodiment is described in the following by referring to FIGS. 6A and 6B, in which some examples for apparatuses according to embodiments are shown.

FIG. 6A shows an eNB 1 as an example for a corresponding apparatus such as network control element, a base station or the like according to a general embodiment of the present invention. The eNB 1 comprises a connection unit 12 (e.g., transceiver) and a processor 11. The connection unit 12 is configured to provide connection to a network (e.g., to at least one user equipment 2 shown in FIG. 6B). The processor 21 is configured to control transmission of reference signals such that reference signals are transmitted in different time intervals depending on the strength of reception of the reference signals at the user equipment (UE) side.

For example, the reference signals may comprise weak reference signals and strong reference signals, so that the weak reference signals are transmitted during a first time interval, and the second reference signals are transmitted during a second time interval. A threshold may be used to distinguish between weak and strong reference signals.

According to a modification, also several threshold may be applied, that is reference signals having a certain reception strength range may be transmitted in a certain time interval, wherein a plurality of reception strength ranges and corresponding time intervals may be applied.

The processor 11 may also be configured to define the time intervals, or, alternatively, the time intervals may be preconfigured in the network.

The processor 11 may be configured to inform a user equipment (e.g., UE 2 shown in FIG. 6B) about the time intervals.

FIG. 6B shows a user equipment (UE) 2 as an example for an apparatus which is capable of performing measurements on reference signals. The UE 2 comprises a connection unit 22 (e.g., transceiver) and a processor 21. The connection unit 22 is configured to provide connection to a network (e.g., to the eNB 1 shown in FIG. 6A). The processor 21 is configured to receive configuration information for measuring reference signals, wherein the configuration information comprises an indication about time intervals, during which reference signal with different strength of reception are sent.

Moreover, the processor 21 may be configured to perform gain adjustments for measuring the reference signals.

For example, the processor 21 may be configured to adjust gain control parameters for reference signal measurements depending on the strength of reception of a reference signal during a particular time interval.

An example for the gain control parameters are AGC parameters.

The eNB 1 and the UE 2 may also comprise memories 13 and 23, respectively, for storing data and programs, by means of which the corresponding processor may carry out its corresponding functions.

An example for the reference signal is the CSI RS described above in connection with the more detailed embodiments of the present invention.

The weak and the strong reference signals may be orthogonal to each other.

According to further aspects of the invention, also methods may be provided which comprise carrying out the functions executed by the processors as described above.

Moreover, also corresponding computer programs may be provided which comprise code means for performing any of the above methods when run on a processing means or module.

Hence, in some more detail, according to embodiments of the present invention, a control of TX signals at base stations is performed such that strong and weak CSI-RS can be measured by UE in different time intervals, and the UE is informed about the respective intervals for adjusting the AGC parameters for CSI-RS measurements.

It is noted that the embodiments and the present invention in general are not limited to the specific examples given above.

It is to be understood that any of the above modifications can be applied singly or in combination to the respective aspects and/or embodiments to which they refer, unless they are explicitly stated as excluding alternatives.

For the purpose of the present invention as described herein above, it should be noted that method steps likely to be implemented as software code portions and being run using a processor at a network element or terminal (as examples of devices, apparatuses and/or modules thereof, or as examples of entities including apparatuses and/or modules therefore), are software code independent and can be specified using any known or future developed programming language as long as the functionality defined by the method steps is preserved;

generally, any method step is suitable to be implemented as software or by hardware without changing the idea of the invention in terms of the functionality implemented;

method steps and/or devices, units or means likely to be implemented as hardware components at the above-defined apparatuses, or any module(s) thereof, (e.g., devices carrying out the functions of the apparatuses according to the embodiments as described above, eNode-B etc. as described above) are hardware independent and can be implemented using any known or future developed hardware technology or any hybrids of these, such as MOS (Metal Oxide Semiconductor), CMOS (Complementary MOS), BiMOS (Bipolar MOS), BiCMOS (Bipolar CMOS), ECL (Emitter Coupled Logic), TTL (Transistor-Transistor Logic), etc., using for example ASIC (Application Specific IC (Integrated Circuit)) components, FPGA (Field-programmable Gate Arrays) components, CPLD (Complex Programmable Logic Device) components or DSP (Digital Signal Processor) components;

devices, units or means (e.g. the above-defined apparatuses, or any one of their respective means) can be implemented as individual devices, units or means, but this does not exclude that they are implemented in a distributed fashion throughout the system, as long as the functionality of the device, unit or means is preserved;

an apparatus may be represented by a semiconductor chip, a chipset, or a (hardware) module comprising such chip or chipset; this, however, does not exclude the possibility that a functionality of an apparatus or module, instead of being hardware implemented, be implemented as software in a (software) module such as a computer program or a computer program product comprising executable software code portions for execution/being run on a processor;

a device may be regarded as an apparatus or as an assembly of more than one apparatus, whether functionally in cooperation with each other or functionally independently of each other but in a same device housing, for example.

It is noted that the embodiments and examples described above are provided for illustrative purposes only and are in no way intended that the present invention is restricted thereto.

The invention claimed is:

1. A method for cooperative multipoint transmission in a first cooperation area of a plurality of cooperation areas, each cooperation area includes three sites of which each site has three cells, the method comprising:
controlling transmission of channel state information reference signals in the first cooperation area such that the channel state information reference signals are transmitted in different time intervals depending on a strength of the channel state information reference signals being transmitted; and
applying a channel state information reference signal activation pattern, the channel state information reference signal activation pattern separating strong channel components from weak channel components, the channel state information reference signal transmitted in the first cooperation area being consistently orthogonal to channel state information reference signals simultaneously transmitted in active cooperation areas of the plurality of cooperation areas that are adjacent to the first cooperation area,
wherein the strong channel components and the weak channel components are measured separately from each other in different time intervals,
wherein, in the time interval for measuring the weak channel components, the strong channel components are not transmitted, and
wherein a distance between sites that transmit identical channel state information reference signals is at least three inter-site distances away from each other.

2. The method according to claim 1, further comprising defining the time intervals.

3. A method, comprising:
receiving configuration information for measuring channel state information reference signals, the configuration information includes an indication about time intervals during which the channel state information reference signals with different transmission strength are transmitted in a first cooperation area of a plurality of cooperation areas, each cooperation area includes three sites of which each site has three cells; and
adjusting, based on the configuration information, one or more gain control parameters for measuring the channel state information reference signals depending on the transmission strength of the channel state information reference signals during the time intervals, the channel state information reference signal transmitted in the first cooperation area being consistently orthogonal to channel state information reference signals simultaneously transmitted in active cooperation areas of the plurality of cooperation areas that are adjacent to the first cooperation area,
wherein strong channel components and weak channel components are measured separately from each other in different time intervals,
wherein, in the time interval for measuring the weak channel components, the strong channel components are not transmitted, and
wherein a distance between sites that transmit identical channel state information reference signals is at least three inter-site distances away from each other.

4. The method according to claim 3 further comprising:
adjusting an input dynamic range of a receiver in the time intervals for adapting the receiver to receive strong or weak channel state information reference signals.

5. The method according to claim 3 further comprising:
transmitting reports on the strength of reception of the channel state information reference signals.

6. The method according to claim 3 wherein, for the cooperative multipoint transmission, the configuration information comprises an indication about the channel state information reference signal activation pattern.

7. An apparatus, comprising:
at least one memory including computer program code, the at least one memory and the computer program code configured, with at least one processor, to cause the apparatus to perform at least the following:
provide a connection to a mobile network for cooperative multipoint transmission in a first cooperation area of a plurality of cooperation areas, each cooperation area includes three sites of which each site has three cells;
control transmission of channel state information reference signals in the first cooperation area such that the channel state information reference signals are transmitted in different time intervals depending on a strength of transmission of the channel state information reference signals to a user equipment; and
apply a channel state information reference signal activation pattern, the channel state information reference signal activation pattern separating strong channel components from weak channel components, the channel state information reference signal transmitted in the first cooperation area being consistently orthogonal to channel state information reference signals simultaneously transmitted in active cooperation areas of the plurality of cooperation areas that are adjacent to the first cooperation area,
wherein the strong channel components and the weak channel components are measured separately from each other in different time intervals,
wherein, in the time interval for measuring the weak channel components, the strong channel components are not transmitted, and
wherein a distance between sites that transmit identical channel state information reference signals is at least three inter-site distances away from each other.

8. The apparatus according to claim 7, and the at least one memory and the computer program code configured, with the at least one processor, to cause the apparatus further to define the time intervals.

9. The apparatus according claim 7, and the at least one memory and the computer program code configured, with the at least one processor, to cause the apparatus further to inform the user equipment about the time intervals.

10. The apparatus according to claim 7, and the at least one memory and the computer program code configured, with the at least one processor, to cause the apparatus further to:
receive reports from the user equipment based on a strength of reception of the channel state information reference signals at the user equipment.

11. The apparatus according to claim 7, and the at least one memory and the computer program code configured, with the at least one processor, to cause the apparatus further to:
support cooperative multipoint transmission.

12. An apparatus, comprising:
at least one memory including computer program code, the at least one memory and the computer program code configured, with at least one processor, to cause the apparatus to perform at least the following:
provide a connection to a mobile network for cooperative multipoint transmission in a first cooperation area of a plurality of cooperation areas, each cooperation area includes three sites of which each site has three cells;
receive configuration information for measuring channel state information reference signals, the configuration information includes an indication about time intervals during which the channel state information reference signals with different transmission strength are transmitted in the first cooperation area; and
adjust, based on the configuration information, one or more gain control parameters for measuring the channel state information reference signals depending on the transmission strength of the channel state information reference signals during the time intervals, the channel state information reference signal transmitted in the first cooperation area being consistently orthogonal to channel state information reference signals simultaneously transmitted in active cooperation areas of the plurality of cooperation areas that are adjacent to the first cooperation area,
wherein the strong channel components and the weak channel components are measured separately from each other in different time intervals,
wherein, in the time interval for measuring the weak channel components, the strong channel components are not transmitted, and
wherein a distance between sites that transmit identical channel state information reference signals is at least three inter-site distances away from each other.

13. The apparatus according to claim 12, and the at least one memory and the computer program code configured, with the at least one processor, to cause the apparatus further to adjust an input dynamic range of a connection unit in the time intervals for adapting the connection unit to receiving strong or weak reference signals.

14. The apparatus according claim 12, and the at least one memory and the computer program code configured, with the at least one processor, to cause the apparatus further to transmit reports on the strength of reception of the channel state information reference signals.

15. The apparatus according to claim 12, and the at least one memory and the computer program code configured, with the at least one processor, to cause the apparatus further to support cooperative multipoint transmission, wherein the configuration information comprises an indication about a channel state information reference signal activation pattern.

16. A computer program product comprising a non-transitory computer-readable storage medium bearing computer program code embodied therein for use with a computer, the computer program code comprising code for:
controlling transmission of channel state information reference signals in a first cooperation area of a plurality of cooperation areas such that the channel state information reference signals are transmitted in different time intervals depending on a strength of the channel state information reference signals being transmitted, each cooperation area includes three sites of which each site has three cells; and
applying a channel state information reference signal activation pattern, the channel state information reference signal activation pattern separating strong channel components from weak channel components, the channel state information reference signal transmitted in the first cooperation area being consistently orthogonal to channel state information reference signals simultaneously transmitted in active cooperation areas of the plurality of cooperation areas that are adjacent to the first cooperation area,
wherein the strong channel components and the weak channel components are measured separately from each other in different time intervals,
wherein, in the time interval for measuring the weak channel components, the strong channel components are not transmitted, and
wherein a distance between sites that transmit identical channel state information reference signals is at least three inter-site distances away from each other.

* * * * *